US011813827B2

(12) United States Patent
Hung et al.

(10) Patent No.: US 11,813,827 B2
(45) Date of Patent: Nov. 14, 2023

(54) CLEAR FILM FOR BAGS

(71) Applicant: Inteplast Group Corporation, Livingston, NJ (US)

(72) Inventors: Shen-Hsiu Hung, Sugarland, TX (US); Ter-Hai Lin, Sugarland, TX (US)

(73) Assignee: INTEPLAST GROUP CORPORATION, Livingston, NJ (US)

( * ) Notice: Subject to any disclaimer, the term of this patent is extended or adjusted under 35 U.S.C. 154(b) by 240 days.

(21) Appl. No.: 16/658,419

(22) Filed: Oct. 21, 2019

(65) Prior Publication Data

US 2021/0114277 A1 Apr. 22, 2021

(51) Int. Cl.
*B32B 27/32* (2006.01)
*B32B 27/08* (2006.01)

(52) U.S. Cl.
CPC ............. *B32B 27/32* (2013.01); *B32B 27/08* (2013.01); *B32B 2307/558* (2013.01); *B32B 2307/582* (2013.01); *B32B 2307/72* (2013.01); *B32B 2307/732* (2013.01)

(58) Field of Classification Search
CPC ............ B29C 48/18; B29C 2948/9219; B29C 2948/92152; B29C 48/10; B29C 2948/92647; B29C 2948/92685; B29C 2948/92942; B29C 48/0018; B32B 27/08; B32B 27/32; B32B 2307/558; B32B 2307/732; B32B 2307/582; B32B 2307/72; B29L 2031/7128; B29K 2995/0081; B29K 2995/0026; B29K 2023/0625; B29K 2995/0022
See application file for complete search history.

(56) References Cited

U.S. PATENT DOCUMENTS

| 6,368,545 B1 * | 4/2002 | Bailey | B29C 48/335 |
| | | | 264/209.7 |
| 2008/0057238 A1 * | 3/2008 | Follestad | B32B 27/32 |
| | | | 428/35.2 |
| 2010/0304062 A1 * | 12/2010 | Daviknes | B32B 27/32 |
| | | | 428/35.2 |
| 2011/0151216 A1 * | 6/2011 | Pirtle | C08L 23/0815 |
| | | | 428/213 |

OTHER PUBLICATIONS

ASTM Standard D1709-22, "Standard Test Methods for Impact Resistance of Plastic Film by the Free-Falling Dart Method," ASTM International, West Conshohocken, PA, 2022, DOI: 10.1520/D1709-22. (Year: 2022).*

* cited by examiner

*Primary Examiner* — John D Freeman
(74) *Attorney, Agent, or Firm* — Stinson LLP

(57) ABSTRACT

A multilayer film having coextruded layers comprising a znLLDPE-based core layer, and mLLDPE-based outer layers on each side of the core layer comprising, wherein the znLLDPE of the core layer has a density which is less than 0.005 g/cc different from a density of the mLLDPE of the outer layers, and wherein the znLLDPE of the core layer has a melting temperature which is less than 15° C. different from a melting temperature of the mLLDPE of the outer layers.

18 Claims, No Drawings

CLEAR FILM FOR BAGS

FIELD OF THE INVENTION

The present invention generally relates to clear plastic films for use in applications such as food storage bags, zipper bags, and medical specimen bags.

BACKGROUND OF THE INVENTION

Clear films for use in bag applications often contain conventional low density polyethylene (LDPE) because LDPE is known to impart good clarity, gloss, and low haze. However, LDPE-containing films do not have physical properties as good as those of LLDPE-based films.

SUMMARY OF THE INVENTION

Briefly, therefore, the invention is directed to a multilayer film having coextruded layers comprising a znLLDPE-based core layer, and mLLDPE-based outer layers on each side of the core layer comprising, wherein the znLLDPE of the core layer has a density which is less than 0.005 g/cc different from a density of the mLLDPE of the outer layers, and wherein the znLLDPE of the core layer has a melting temperature which is less than 15° C. different from a melting temperature of the mLLDPE of the outer layers.

Other objects and features will be in part apparent and in part pointed out below.

DETAILED DESCRIPTION OF PREFERRED EMBODIMENTS

Films prepared according to this invention are multi-layer films which contain at least three layers. The outer skin layers are based on metallocene catalyzed ethylene copolymers (mLLDPE) and the core layer is based on Ziegler-Natta catalyst catalyzed ethylene copolymers (znLLDPE). The outer skin layers are "mLLDPE-based" in the sense that the skin layer material is at least about 50 wt % mLLDPE, typically more than about 80 wt % mLLDPE. In some embodiments, the outer skin layers consist of only mLLDPE or consist of only mLLDPE and up to no more than 2 wt % additives. Similarly, the core layer is "znLLDPE-based" in the sense that the core layer material is at least about 50 wt % znLLDPE, typically at least about 80 wt % znLLDPE. In some embodiments, the core layer consists only of znLLDPE or consists of only znLLDPE and up to no more than 2 wt % additives. Optional additives for the core layer include antistats, slip agents, stabilizers, antioxidants, colorants, and others. Optional additives for the skin layers include antistats, antiblocks, slip agents, stabilizers, antioxidants, colorants, processing aids, etc.

Linear low-density polyethylene (LLDPE) is a mostly linear polyethylene polymer having significant numbers of short branches. The absence of long-chain branching differentiates LLDPE from LDPE (conventional low-density polyethylene). The mLLDPE-based outer layers of the invention contain no more than 25 wt % conventional LDPE, preferably no more than 2 wt %, and are preferably LDPE-free in the sense that they contain no or only trace amounts of LDPE. The znLLDPE-based core layer of the invention contains no more than 25 wt % conventional LDPE, preferably no more than 2 wt %, and is preferably LDPE-free in the sense that it contains no or only trace amounts of LDPE. The overall film therefore contains no more than 25 wt % conventional LDPE, preferably no more than 2 wt %, and is preferably LDPE-free in the sense that it contains no or only trace amounts of LDPE The overall thickness of the film is between about 5 and about 200 µm, such as between about 10 and about 50 µm. The core layer has a thickness between about 2.5 and about 180 µm, such as between about 5 and about 45 µm. Each outer skin layer has a thickness between about 0.25 and about 40 µm, such as between about 0.5 and about 10 µm. In preferred embodiments, the core layer and outer skin layers are the only layers in the film, and the outer skin layers are directly on the core layer. In a preferred embodiment, the core layer is at least about half the thickness of each outer layer, so the thickness ratio of the core layer to each outer layer is between about 1:2 and about 20:1, such as between about 1:1 and about 10:1.

In accordance with this invention, it has been discovered that exceptional optical qualities can be obtained without sacrificing mechanical properties, and exceptional mechanical properties can be obtained without sacrificing optical properties, by careful selection of materials for use in the respective layers. In particular, the present invention avoids the use of LDPE in the layers, because LDPE—while it provides good optical qualities—does not provide the desired mechanical properties. The invention uses znLLDPE in the core layer, but avoids the use of znLLDPE in the skin layers because using znLLDPE in both layers does not provide good optical properties. The invention uses mLLDPE in the outer skin layers, but avoids using mLLDPE having a density below about 0.91 because lower density LLDPE films tend to be more difficult to handle because they are stickier with higher coefficient of friction.

The outer skin layers of the invention are mLLDPE-based as described above and the density of the mLLDPE material of the skin layers is less than 0.005 g/cc different from the density of the znLLDPE of the core layer. Moreover, the mLLDPE of the skin layers is selected to have a melting temperature ($T_m$) which is less than 15° C. different from the melting temperature of the znLLDPE of the core layer. It has been discovered that using an mLLDPE with a density greater than 0.91 and a znLLDPE material which has a density and melt temperature similar to that of the mLLDPE material overcomes the respective deficiencies of znLLDPE (poor optical qualities) and LDPE films (poor mechanical properties) while keeping the respective good qualities of znLLPDE and LDPE films. Such films have excellent processability in extrusion and converting.

The optical properties and in particular the clarity of the films of of the invention and of bags made from such films are excellent. The multilayer films have a gloss % of at least 40%, such as at least 50%, 60%, or even 70% in some inventions. The haze is less than 15%, such as less than 15% or even less than 10%. In this context and as described and claimed herein, gloss is measured according to ASTM D2457, and haze is measured according to ASTM D1003.

These films also have excellent physical properties. The (machine direction) MD tear strength is at least 200 g, and in some embodiments even greater than 300 g or greater than 400 g. The (transverse direction) TD tear strength is at least 300 g, and in some embodiments greater than 400 g. The dart impact strength is at least 750 g and 750 g/mil. In this context and as described and claimed herein, MD tear strength and TD tear strength are measured according to ASTM D1922, and dart impact strength is measured according to ASTM D1709.

EXAMPLES 1-4

Four films were prepared in accordance with the invention and tested. The film samples were produced in a lab coextruder with layflat of 13", BUR (Blow-up Ratio) of 3.0, skin/core/skin layer ratio of 25:50:25, extruder temperature profile of about 330-380° F. and die temperature profile of about 380° F. The results are shown in Table 1. Example 1 was prepared by coextruding outer skin layers of mLLDPE having a density of 0.918 g/cc with a core layer of znLLDPE having a density of 0.916 g/cc. In Example 1 and the other examples, the skin/core/skin thickness ratios were the same. It can be seen in Table 1 that the criteria for preferred embodiments of the invention were satisfied because the outer skin layer material was mLLDPE-based, the core material was znLLDPE-based, the differential between the $T_m$ of the outer skin layer material and $T_m$ of the core material was less than 15° C., the density differential was less than 0.005 g/cc, and the density of both the core and outer layer material was greater than 0.910 g/cc. The multilayer films of each of Examples 1-4 had excellent optical properties, including a gloss % of at least 40% and a haze % of less than 15%. These films also had excellent mechanical properties, in particular, a MD tear strength of at least 200 g, a TD tear strength of at least 300, a dart impact strength of at least 750 g and 750 g/mil.

TABLE 1

|  | Ex. 1 | Ex. 2 | Ex. 3 | Ex. 4 |
|---|---|---|---|---|
| Outer | mLLDPE 0.918 g/cc 119° C. $T_m$ | mLLDPE 0.916 g/cc 117° C. $T_m$ | mLLDPE 0.918 g/cc 121° C. $T_m$ | mLLDPE 0.916 g/cc 117° C. $T_m$ |
| Core | znLLDPE 0.916 g/cc 131° C. $T_m$ | znLLDPE 0.916 g/cc 131° C. $T_m$ | znLLDPE 0.918 g/cc 131° C. $T_m$ | znLLDPE 0.918 g/cc 131° C. $T_m$ |
| Density differential g/cc | .002 | 0 | 0 | .002 |
| Melting Temp $T_m$ Differential ° C. | 12 | 14 | 10 | 14 |
| Overall Thickness μm | 22.3 | 25.4 | 20.7 | 23.2 |
| MD Tear g | 354 | 412 | 210 | 240 |
| TD Tear g | 431 | 477 | 315 | 422 |
| Dart Impact g | 876 | 789 | 800 | 800 |
| Dart Impact g/mil | 998 | 789 | 982 | 876 |
| Gloss % | 57.8 | 69.3 | 43.4 | 79 |
| Haze % | 10.5 | 6.88 | 13.6 | 4.72 |

COMPARATIVE EXAMPLES A-E

Five comparative films were prepared and tested and are shown in Table 2. Comparative Example A shows that a three-layer coextruded film of LDPE-based layers has good optical properties. But the mechanical properties fall well short of those achieved by the invention. Comparative Example B shows generally the same for a three-layer extruded film with blended znLLDPE and LDPE as the material for the layers. Comparative Examples C and D show that using znLLDPE for both core and outer layers results in good mechanical properties, but much poorer optical properties than achieved with the combination of the invention. Comparative Example E shows good mechanical and optical properties, but the density differential, $T_m$ differential, and density of the outer skin layer material fall outside the scope of the combination of the invention.

TABLE 2

|  | Comp. Ex. A | Comp. Ex. B | Comp. Ex. C | Comp. Ex. D | Comp. Ex. E |
|---|---|---|---|---|---|
| Outer | LDPE | znLLDPE 70% LDPE 30% | znLLDPE 0.916 g/cc 131° C. $T_m$ | znLLDPE 0.918 g/cc 131° C. $T_m$ | mLLDPE 0.902 g/cc 99° C. $T_m$ |
| Core | LDPE | znLLDPE 70% LDPE 30% | znLLDPE 0.916 g/cc 131° C. $T_m$ | znLLDPE 0.918 g/cc 131° C. $T_m$ | znLLDPE 0.916 g/cc 131° C. $T_m$ |
| Density differential g/cc | 0 | 0 | 0 | 0 | 0.014 |
| Melting Temp $T_m$ Differential ° C. | 0 | 0 | 0 | 0 | 32 |
| Overall Thickness μm | 24.6 | 21.8 | 22.7 | 23.3 | 27.9 |
| MD Tear g | 150 | 35 | 336 | 168 | 351 |
| TD Tear g | 147 | 400 | 532 | 349 | 538 |
| Dart Impact g | 84 | 81 | 564 | 106 | 876 |
| Dart Impact g/mil | 87 | 94 | 631 | 116 | 798 |
| Gloss % | 76.2 | 56.7 | 6.9 | 11.1 | 75.9 |
| Haze % | 5.3 | 13.1 | 61.7 | 50.2 | 5.03 |

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above products and methods without departing from the scope of the invention, it is intended that all matter contained in the above description shall be interpreted as illustrative and not in a limiting sense.

What is claimed is:

1. A coextruded film comprising:
   a znLLDPE-based core layer comprising at least about 50 wt. % znLLDPE; and
   mLLDPE-based outer layers on each side of the core layer comprising at least about 50 wt % mLLDPE;
   wherein the znLLDPE of the core layer has a density which is less than 0.005 g/cc different from a density of the mLLDPE of the outer layers;
   wherein the znLLDPE of the core layer has a melting temperature which is less than 15° C. different from a melting temperature of the mLLDPE of the outer layers; and
   wherein the film has an overall thickness, the overall thickness is between 5 and 200 microns, the film has a dart impact strength under ASTM D1709, and the dart impact strength divided by the overall thickness is greater than 750 g/mil.

2. The coextruded film of claim 1 wherein the film contains less than 25 wt % LDPE.

3. The coextruded film of claim 1 wherein the film contains less than 2 wt % LDPE.

4. The coextruded film of claim 1 wherein the film is LDPE free.

5. The coextruded film of claim 1 wherein the core layer comprises at least about 80 wt % znLLDPE and the outer layers comprise at least about 80 wt % mLLDPE.

6. The coextruded film of claim 1 wherein the core layer consists of znLLDPE and no more than 2 wt % additives.

7. The coextruded film of claim 1 wherein the core layer consists of znLLDPE and no more than 2 wt % additives, and the outer layers consist of mLLDPE and no more than 2 wt % additives.

8. The coextruded film of claim 1 wherein the mLLDPE has a density of at least about 0.91 g/cc.

9. The coextruded film of claim 1 consisting of the outer layers and the core layer, wherein the outer layers are directly on each side of the core layer, and wherein each outer layer has a thickness between 0.5 and 10 μm and the core layer has a thickness between 5 and 45 μm.

10. The coextruded film of claim 1 wherein the film has a gloss of at least 40% measured according to ASTM D2457 and a haze of less than 15% measured according to ASTM D1003.

11. The coextruded film of claim 1 wherein the film has a MD tear strength of at least 300 g as measured according to ASTM D1922, and a TD tear strength of at least 400 g as measured according to ASTM D1922.

12. The coextruded film of claim 1 having an overall thickness between 5 and 200 μm.

13. The coextruded film of claim 1 having an overall thickness between 10 and 50 μm.

14. The coextruded film of claim 1 wherein each outer layer has a thickness between 0.5 and 10 μm and the core layer has a thickness between 5 and 45 μm.

15. The coextruded film of claim 1 having a ratio of core thickness: each outer layer thickness between 1:1 and 10:1.

16. The coextruded film of claim 1 wherein:
the core layer consists of znLLDPE and no more than 2 wt % additives;
the outer layers consist of mLLDPE and no more than 2 wt % additives;
the mLLDPE has a density of at least about 0.91 g/cc;
the film has a gloss of at least 40% as measured according to ASTM D2457 and a haze of less than 15% as measured according to ASTM D1003; and
the film has a MD tear strength of at least 200 g as measured according to ASTM D1922 and a TD tear strength of at least 300 g as measured according to ASTM D1922.

17. The coextruded film of claim 16 wherein the film is LDPE free.

18. The coextruded film of claim 17 wherein each outer layer has a thickness between 0.5 and 10 μm and the core layer has a thickness between 5 and 45 μm.

\* \* \* \* \*